(12) United States Patent
Oda et al.

(10) Patent No.: US 7,741,604 B2
(45) Date of Patent: *Jun. 22, 2010

(54) BOLOMETER-TYPE THZ-WAVE DETECTOR

(75) Inventors: Naoki Oda, Tokyo (JP); Susumu Komiyama, Tokyo (JP); Iwao Hosako, Tokyo (JP)

(73) Assignees: NEC Corporation, Tokyo (JP); The University of Tokyo, Tokyo (JP); National Institute of Information and Communications Technology, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 12/056,569

(22) Filed: Mar. 27, 2008

(65) Prior Publication Data

US 2008/0237467 A1 Oct. 2, 2008

(30) Foreign Application Priority Data

Mar. 27, 2007 (JP) ............................. 2007-081827

(51) Int. Cl.
*G01J 5/00* (2006.01)
(52) U.S. Cl. .................................. 250/338.1
(58) Field of Classification Search ............... 250/338.1
See application file for complete search history.

(56) References Cited

U.S. PATENT DOCUMENTS 5,144,149 A * 9/1992 Frosch .................... 250/493.1
5,288,649 A * 2/1994 Keenan ....................... 438/54
6,329,655 B1 12/2001 Jack et al.
7,557,349 B2 * 7/2009 Oda et al. ................ 250/341.1
2004/0200962 A1 * 10/2004 Ishikawa et al. ........ 250/339.04

* cited by examiner

*Primary Examiner*—David P Porta
*Assistant Examiner*—Shun Lee
(74) *Attorney, Agent, or Firm*—Young & Thompson

(57) ABSTRACT

In a micro-bridge structure in which a temperature detecting portion 14 (diaphragm) including a bolometer thin film 7 is supported by a supporting portion 13 in a state floated from a circuit substrate 2, a reflective film 3 reflecting a THz wave is formed on the circuit substrate 2, an absorbing film 11 absorbing the THz wave is formed on the temperature detecting portion 14, and an optical resonance structure is formed by the reflective film 3 and the temperature detecting portion 14. And a gap between the reflective film 3 and the temperature detecting portion 14 is set approximately ¼ of a wavelength of an infrared ray on the basis of the wavelength of the infrared ray (in a range of approximately 1.5 to 2.5 μm, for example), and a sheet resistance of the temperature detecting portion 14 is set in a range in which an absorptance of the THz wave becomes a predetermined value or above on the basis of the THz wave (in a range of approximately 10 to 100 Ω/sq.). By this arrangement, the absorptance of the THz wave is drastically improved while using the structure and manufacturing technique of a bolometer-type infrared detector.

4 Claims, 17 Drawing Sheets

BOLOMETER-TYPE THZ-WAVE DETECTOR

BACKGROUND OF THE INVENTION

1. Field of the Invention

The present invention relates to a detector for detecting an electromagnetic wave (THz-wave) in a THz-frequency band and more particularly to a bolometer-type THz-wave detector.

2. Description of the Related Art

Recently, an electromagnetic wave in a terahertz frequency band between light and an electromagnetic wave (that is, an electromagnetic wave with a frequency of $10^{12}$ Hz and a wavelength of approximately 30 μm to 1 mm, hereinafter referred to as THz-wave) has drawn attention as the electromagnetic wave directly reflecting information of a substance. A detector for detecting the THz wave (hereinafter referred to as a THz-wave detector) is generally in a structure comprising an antenna portion such as a dipole antenna or a Bow-tie antenna capturing the THz wave and an electric signal conversion portion for converting the THz wave captured by the antenna portion into an electric signal. As methods of converting the electromagnetic wave into the electric signal, Capacitive coupling method, Resistive coupling method and the like are known.

U.S. Pat. No. 6,329,655 discloses, for example, a Capacitive-coupling type THz-wave detector as shown in FIGS. 16A and 16B. This THz-wave detector is in a structure in which a glass layer 21 is formed on a substrate 20, four metal antennas 22 (Bow-tie antennas) are formed on the glass layer 21, and a detecting element 27 in which a heater film 23, an insulator 24, a thermal resistance layer 25, and an insulator 26 are laminated is formed at the center part of the four metal antennas 22 with a predetermined gap (GAP 1 and GAP 2) from the glass layer 21 and the metal antennas 22.

U.S. Pat. No. 6,329,655 also discloses a Resistive-coupling type THz-wave detector as shown in FIGS. 17A and 17B. This THz-wave detector is in a structure in which the glass layer 21 is formed on the substrate 20, the four metal antennas 22 (Bow-tie antennas) are formed on the glass layer 21, and the detecting element 27 in which the heater film 23 connected to the four metal antennas 22 is formed with a predetermined gap (GAP 3) from the glass layer 21 and the insulator 24, the thermal resistance layer 25, and the insulator 26 are laminated on the heater film 23 is formed at the center part of the four metal antennas 22. In the structure of the Resistive-coupling type THz-wave detector, a leg 28 with an impedance matched to 50 to 100Ω is needed in order to effectively transmit energy collected by the metal antennas 22 to the heater film 23, and heat conductance becomes large. Therefore, it is described that sensitivity of the Resistive-coupling type THz-wave detector is lower by one order of magnitude than that of the Capacitive-coupling type THz-wave detector.

In the case of detection of a THz wave by the Capacitive-coupling type THz-wave detector, efficient transmission of energy collected by the metal antennas 22 to the heater film 23 is required. For that purpose, a gap between the glass layer 21 and the detecting element 27 (GAP 1), and a gap between the metal antenna 22 and the detecting element 27 (GAP 2) should be controlled accurately. The above U.S. Pat. No. 6,329,655 describes that a scope of 0.1 to 1 μm is preferable as the value of GAP 2. However, if the detecting element 27 is to be floated from the glass layer 21 by the leg 28 using the MEMS (Micro-Electro-Mechanical Systems) technology, it is difficult to set the gap within the range of 0.1 to 1 μm, and there is a problem that yield is lowered.

In the case of detection of the THz wave by the Resistive-coupling type THz-wave detector, efficient transmission of the energy collected by the metal antennas 22 to the heater film 23 is also required. For that purpose, the gap between the glass layer 21 and the heater film 23 (GAP 3) should be controlled accurately. The above U.S. Pat. No. 6,329,655 describes that a scope of 0.2 to 1 μm is preferable as the value of GAP 3. However, if the heater film 23 is to be floated from the glass layer 21 using the MEMS technology, it is difficult to set the gap within the range of 0.2 to 1 μm, and there is a problem that yield is lowered.

It is also known that an effective aperture that can capture the electromagnetic wave by the antenna becomes an area merely of a circle with a radius of a half wavelength at the most. It is necessary to increase the size of the metal antenna 22 to efficiently capture the THz wave, but if the THz-wave detector in the above structure is made into a two-dimensional array, the size of each detector is limited. Therefore, the size of the detecting element 27 inevitably becomes small. For example, with the THz wave with the wavelength of 1 mm, the size of the detecting element 27 is approximately several μm. It is extremely difficult to incorporate the detecting element 27 in such a small region of several μm, and there is a problem that the yield is further deteriorated.

SUMMARY OF THE INVENTION

The present invention was made in view of the above problems and has a major object to provide a bolometer-type THz-wave detector which has high performance and can be manufactured with a high yield.

In order to achieve the above object, the present invention comprises a substrate provided with a read-out integrated circuit, a temperature detecting portion opposed to the substrate and provided with a bolometer thin film and an absorbing film for absorbing a THz wave and having a sheet resistance set on the basis of the THz wave, a reflective film formed on a face opposed to the temperature detecting portion of the substrate for reflecting the THz wave and forming an optical resonance structure with the temperature detecting portion, a supporting portion arranged on the substrate and supporting the temperature detecting portion so that a gap between the reflective film and the temperature detecting portion becomes a predetermined gap set on the basis of the wavelength of infrared, and electrode wiring connecting the read-out integrated circuit and the bolometer thin film.

In the present invention, an optical film having a predetermined refractive index transmitting the THz wave may be further provided between the reflective film and the temperature detecting portion.

In the present invention, the optical film may comprise any one of a silicon oxide film, a silicon nitride film, a silicon oxynitride film or a silicon film.

In the present invention, a canopy extending outward from a peripheral portion of the temperature detecting portion may be further provided and the absorbing film may be formed on the canopy.

In the present invention, a gap between the reflective film and the temperature detecting portion is set within a range of 1.5 to 2.5 μm, and the sheet resistance of the temperature detecting portion may be set on the basis of correlation between the sheet resistance of the temperature detecting portion and an absorptance of the THz wave.

In the present invention, the sheet resistance of the temperature detecting portion may be set in a range in which the absorptance of the THz wave becomes 10% or more.

In the present invention, the sheet resistance of the temperature detecting portion may be set in a range of 10 to 100 Ω/square.

As mentioned above, in the present invention, the gap between the reflective film and the temperature detecting portion is set on the basis of the wavelength of infrared, and the sheet resistance of the temperature detecting portion is set on the basis of the THz wave. Thus, the absorptance of the THz wave can be remarkably improved using the structure and manufacturing method of an infrared detector, by which a high-performance THz-wave detector can be manufactured with a high yield.

According to the present invention, a high-performance bolometer-type THz-wave detector can be manufactured with a high yield.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
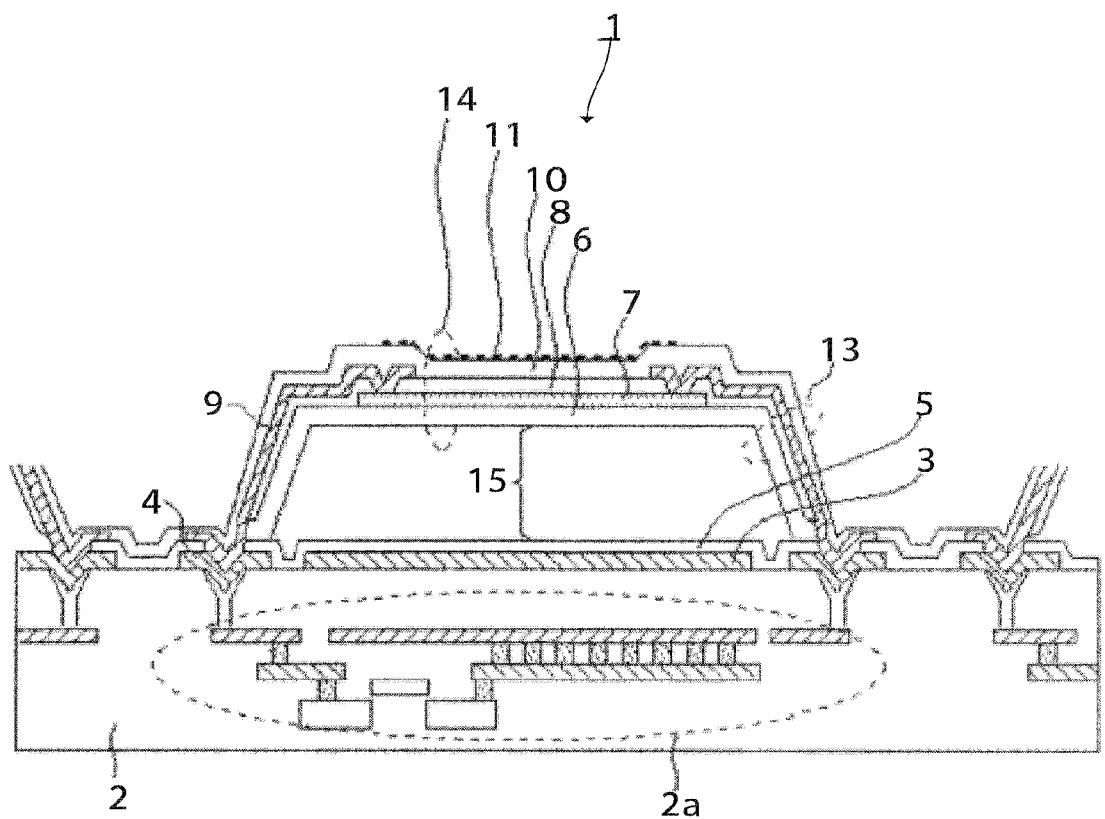
FIG. 1 is a sectional view schematically illustrating a structure of a bolometer-type THz-wave detector according to a first embodiment of the present invention.

As shown in the related art, THz-wave detectors in the Capacitive coupling method and Resistive coupling method are known as the THz-wave detector for detecting a THz wave with a frequency of $10^{12}$ Hz and a wavelength of approximately 30 μm to 1 mm. However, with the THz-wave detectors in these methods, a gap between members needs to be controlled with high accuracy of approximately 0.1 μm, and it is also necessary to incorporate a detecting element 27 in a small region of several μm, which causes a problem that manufacture of a high-performance THz-wave detector with a high yield is difficult.

On the other hand, a bolometer-type infrared detector for detecting an infrared ray with a wavelength of approximately 8 to 12 μm is known. A manufacturing method of the bolometer-type infrared detector is as follows. First, on a substrate in which a read-out integrated circuit is formed inside and a reflective film is formed on an upper face, a sacrifice layer is formed. Then, on an upper layer of the sacrifice layer, a temperature detecting portion including a bolometer thin film and a protective film sandwiching the bolometer thin film is formed, and two supporting portions including electrode wiring on a side face of the sacrifice face, having one end connected to the bolometer thin film and the other end connected to the read-out integrated circuit are formed. Lastly, the sacrifice layer is removed by etching and a bolometer-type infrared detector is manufactured. The bolometer-type infrared detector thus manufactured absorbs incident infrared more efficiently by optical resonance structure (so-called optical resonator) comprising the reflective film and the temperature detecting portion formed on the substrate. The bolometer-type infrared detector obtains an infrared image by reading out resistance change of the bolometer thin film caused by absorbed infrared at the read-out integrated circuit.

While the conventional THz-wave detector captures the THz wave by an antenna, the infrared detector absorbs the infrared by the optical resonance structure. Thus, the both are totally different from each other in a method to take in an electromagnetic wave. However, the THz-wave detector supports the detecting element by the leg, while the infrared detector supports the temperature detecting portion by the supporting portion, which is a common point in their structures. Then, the inventor of the present application proposes a THz-wave detector for detecting a THz wave using the optical resonance structure used in the above bolometer-type infrared detector.

The bolometer-type infrared detector has the optical resonance structure formed so that the infrared ray is efficiently absorbed. Thus, the bolometer-type infrared detector can rarely detect the THz wave. The temperature detecting portion easily transmits the THz wave, and a gap between the reflective film and the temperature detecting portion is set on the basis of a wavelength of the infrared ray. Moreover, the sheet resistance of the temperature detecting portion is several hundreds to several thousands Ω/sq. Under these conditions, the THz-wave absorptance of the bolometer-type infrared detector is merely about several % of the infrared absorptance, and the bolometer-type infrared detector can not be used as the THz-wave detector.

As a method of improving the THz-wave absorptance of the bolometer-type infrared detector, a method of setting the gap between the reflective film and the temperature detecting portion on the basis of the THz wave can be considered. In this case, the sacrifice layer should be formed with a thickness of ¼ of the wavelength of the THz wave, that is, approximately several tens to several hundreds μm, and it is difficult to form the temperature detecting portion and the supporting portion on the sacrifice layer with such a large film thickness. Even if the temperature detecting portion and the supporting portion can be formed, removal of the sacrifice layer by etching becomes difficult, which remarkably deteriorates the yield. Moreover, in a structure that the temperature detecting portion is supported at a height of several tens to several hundreds μm from the substrate, the shape is easily deformed by vibration or impact, and maintaining of high performance is difficult.

From the above findings, in the present invention, in order to enable detection of the THz wave using the structure and manufacturing method of the bolometer-type infrared detector, first, an absorbing film for absorbing the THz wave is added to the temperature detecting portion. Secondly, if the gap between the reflective film and the temperature detecting portion is changed largely, that departs from the conventional manufacturing condition and the yield would be remarkably lowered. Thus, on the basis of the wavelength of the infrared ray, the gap between the reflective film and the temperature detecting portion is set to approximately ¼ of the infrared wavelength. Thirdly, on the basis of correlation data on the sheet resistance of the temperature detecting portion and the electromagnetic-wave absorptance, the sheet resistance of the temperature detecting portion is set in a range in which the THz-wave absorptance becomes a predetermined value or more. By this arrangement, it becomes possible to improve the THz-wave absorptance by using the structure and manufacturing method of the bolometer-type infrared detector and high performance THz-wave detector can be manufactured with a high yield.

EXAMPLE 1

In order to describe the above embodiment in more detail, a bolometer-type THz-wave detector according to the first embodiment of the present invention will be described referring to FIGS. 1 to 7B.

As shown in FIG. 1, a bolometer-type THz-wave detector 1 of this embodiment has, on a circuit substrate 2 having a read-out integrated circuit 2a and the like, a reflective film 3 reflecting an incident THz wave and a contact 4 connected to the read-out integrated circuit 2a are formed, and on top of that, a first protective film 5 is formed. On the contact 4, a supporting portion 13 comprising a second protective film 6, a third protective film 8, an electrode wiring 9, and a fourth protective film 10 is formed. The electrode wiring 9 is connected to the read-out integrated circuit 2a through the contact 4. By the supporting portion 13, a temperature detecting portion 14 (diaphragm) comprising the second protective film 6, a bolometer thin film 7, the third protective film 8, the fourth protective film 10, and an absorbing film 11 is held in the air. The both ends of the bolometer thin film 7 are connected to the electrode wiring 9.

As mentioned above, in order to change the gap 15 between the reflective film 3 and the temperature detecting portion 14, the thickness of the sacrifice layer should be changed. However, if the thickness of the sacrifice layer is largely changed, that departs from the conventional manufacturing conditions and the yield would be remarkably lowered. Therefore, the gap 15 between the reflective film 3 and the temperature detecting portion 14 (in detail, since the gap between the surface of the reflective film 3 and the center in the thickness direction of the temperature detecting portion 14, actually the absorbing film 11 is predominant, the gap between the surface of the reflective film 3 and the absorbing film 11) is set on the basis of the wavelength of the infrared ray. Supposing that the infrared wavelength is 8 to 12 μm, ¼ of the wavelength is 2 to 3 μm, but since the thinner sacrifice layer is more preferable in manufacture, the gap 15 between the reflective film 3 and the temperature detecting portion 14 is set in a range of approximately 1.5 to 2.5 μm in this embodiment.

The sheet resistance of the temperature detecting portion 14 is set on the basis of the THz wave based on FIGS. 6A, 6B, 7A and 7B.

Figure 6A:
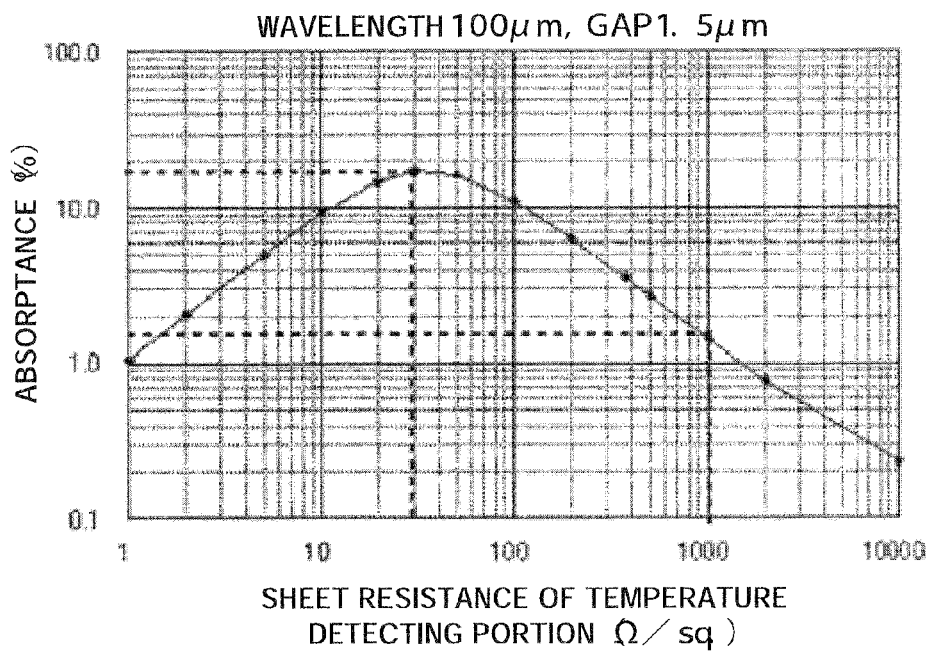
FIG. 6A is a diagram illustrating correlation between sheet resistance of a temperature detecting portion and an absorptance of a THz wave with a wavelength of 100 μm of the bolometer-type THz-wave detector according to the first embodiment of the present invention (when a gap between a reflective film and the temperature detecting portion is 1.5 μm)
Figure 6B:
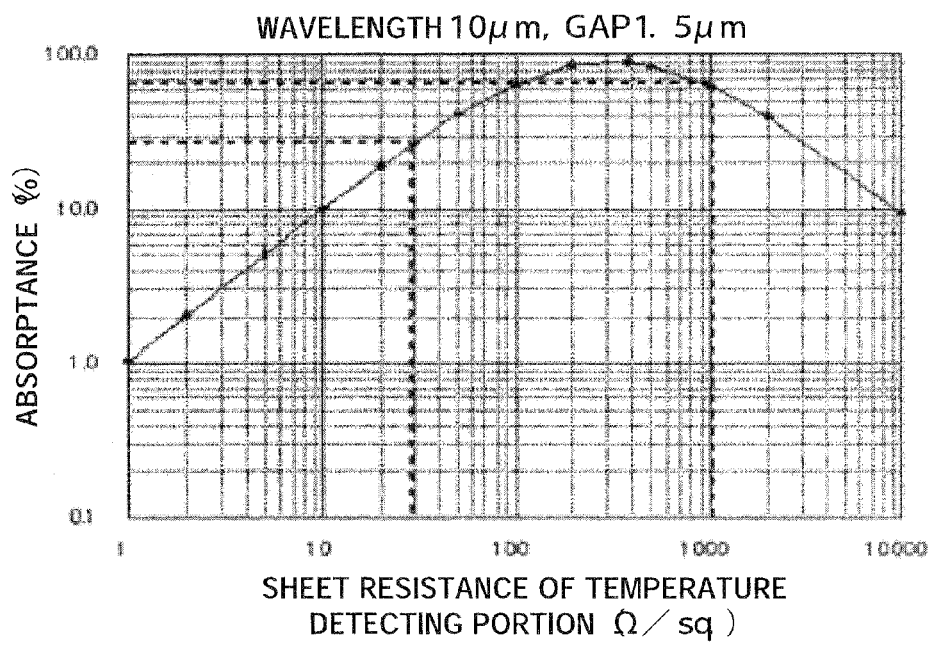
FIG. 6B is a diagram illustrating correlation between sheet resistance of a temperature detecting portion and an absorptance of an infrared ray a wavelength of 10 μm of the bolometer-type THz-wave detector according to the first embodiment of the present invention (when a gap between a reflective film and the temperature detecting portion is 1.5 μm)

FIGS. 6A and 6B are diagrams illustrating the correlation between the sheet resistance of the temperature detecting portion 14 and the electromagnetic-wave absorptance when the gap (GAP) between the reflective film 3 and the temperature detecting portion 14 is set to 1.5 μm, in which FIG. 6A shows an absorption characteristic of the THz wave with the wavelength of 100 μm and FIG. 6B shows the absorption characteristic of an infrared ray with the wavelength of 10 μm. If the sheet resistance of the temperature detecting portion 14 is set to the condition of the conventional infrared detector (1 kΩ/sq., for example), the absorptance of the infrared with the wavelength of 10 μm is approximately 60% from FIG. 6B. On the other hand, the absorptance of the THz wave with the wavelength of 100 μm is approximately 1.5% from FIG. 6A. From this fact, it is known that the THz wave can be hardly detected under the normal condition of the infrared detector. However, if the sheet resistance of the temperature detecting portion 14 is brought close to a peak position (30 Ω/sq.) in FIG. 6A, the absorptance of the THz wave with the wavelength of 100 μm is approximately 18% from the FIG. 6A, which is a drastic increase.

Figure 7A:
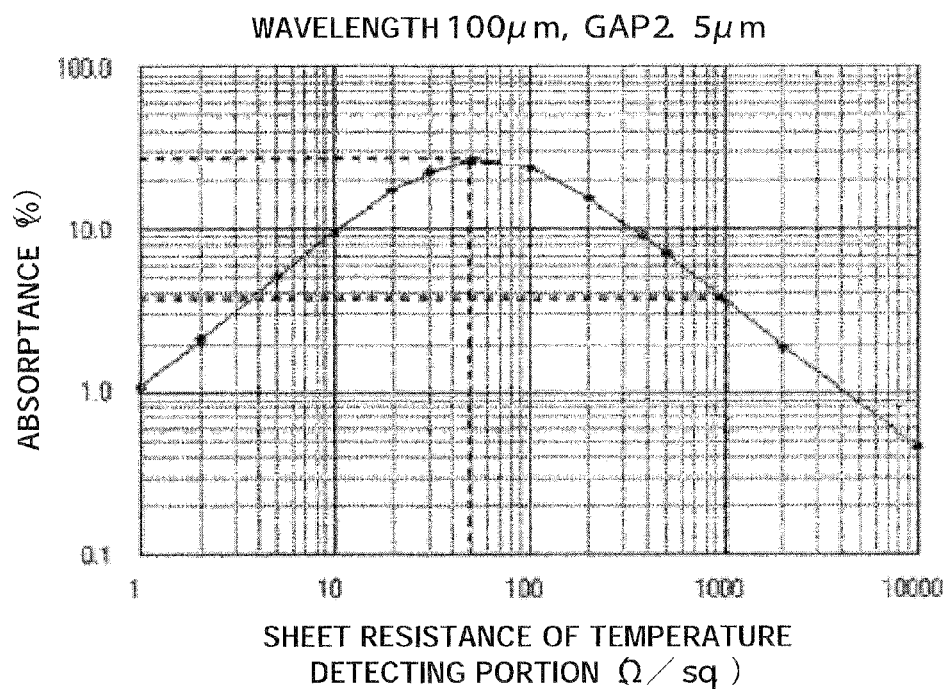
FIG. 7A is a diagram illustrating correlation between sheet resistance of a temperature detecting portion and an absorptance of a THz wave with a wavelength of 100 μm of the bolometer-type THz-wave detector according to the first embodiment of the present invention (when a gap between a reflective film and the temperature detecting portion is 2.5 μm)
Figure 7B:
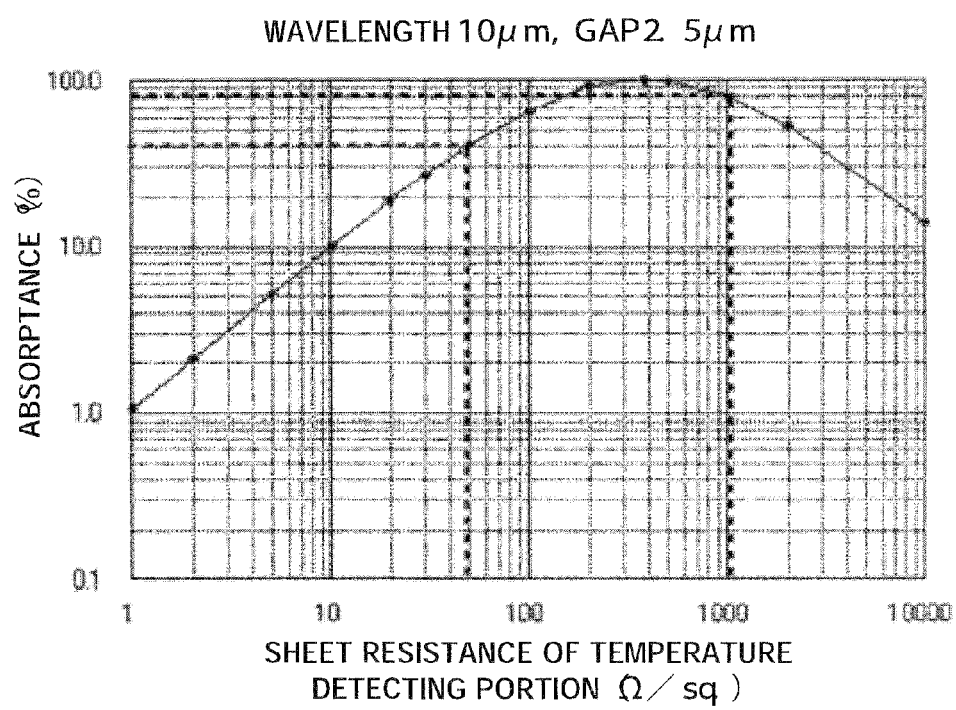
FIG. 7B is a diagram illustrating correlation between sheet resistance of a temperature detecting portion and an absorptance of an infrared ray with a wavelength of 10 μm of the bolometer-type THz-wave detector according to the first embodiment of the present invention (when a gap between a reflective film and the temperature detecting portion is 2.5 μm)

FIGS. 7A and 7B are diagrams illustrating the correlation between the sheet resistance of the temperature detecting portion 14 and the absorptance of the electromagnetic wave when the gap (GAP) between the reflective film 3 and the temperature detecting portion 14 is set to 2.5 μm, in which FIG. 7A shows the absorption characteristic of the THz wave with the wavelength of 100 μm and FIG. 7B shows the absorption characteristic of an infrared ray with the wavelength of 10 μm. If the sheet resistance of the temperature detecting portion 14 is set to the condition of the conventional infrared detector (1 kΩ/sq., for example), the absorptance of the infrared with the wavelength of 10 μm is approximately 80% from FIG. 7B. On the other hand, the absorptance of the THz wave with the wavelength of 100 μm is approximately 3.8% from FIG. 7A. From this fact, it is known that the THz wave can be hardly detected under the normal condition of the infrared detector. However, if the sheet resistance of the temperature detecting portion 14 is brought close to a peak position (50 Ω/sq.) in FIG. 7A, the absorptance of the THz wave with the wavelength of 100 μm is approximately 18% from FIG. 7A, which is a drastic increase.

From the above result, though the peak position of the sheet resistance depends on the gap between the reflective film 3 and the temperature detecting portion 14, by setting the sheet resistance of the temperature detecting portion 14 to a value close to the peak position, the absorptance of the THz wave can be drastically increased. Here, in the normal infrared detector, giving consideration to formation and ease of removal of the sacrifice layer, the gap between the reflective film 3 and the temperature detecting portion 14 is set to approximately 1.5 to 2.5 μm. In this embodiment, too, the gap between the reflective film 3 and the temperature detecting portion 14 is set in a range of approximately 1.5 to 2.5 μm, and a suitable range of the sheet resistance of the temperature detecting portion 14 becomes 30 to 50 Ω/sq. However, if the absorptance is 10% or more, the THz wave can be sufficiently detected, and it may be only necessary from FIGS. 6A and 7A that the sheet resistance of the temperature detecting portion 14 is in a range of 10 to 100 Ω/sq. By inserting a bandpass filter shielding the infrared ray on the incident face side of the bolometer-type THz-wave detector 1, only the THz wave can be efficiently detected.

A manufacturing method of the bolometer-type THz-wave detector 1 with the above structure will be described below referring to FIGS. 2 to 5.

Figure 2:
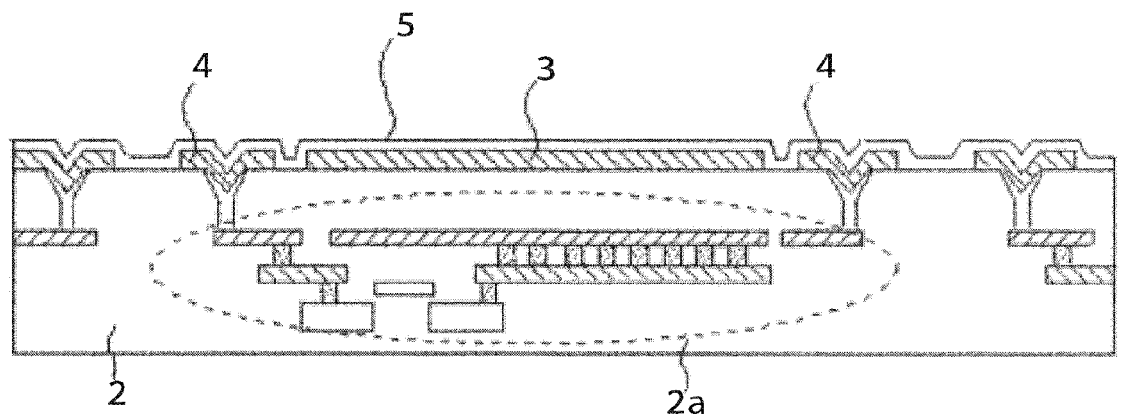
FIG. 2 is a sectional view illustrating a manufacturing method of the bolometer-type THz-wave detector according to the first embodiment of the present invention.

First, as shown in FIG. 2, on the circuit substrate 2 having the read-out integrated circuit 2a such as a CMOS circuit, a film is formed by metal such as Al, Ti and the like with the film thickness of approximately 500 nm by the sputtering method, and a pattern is formed with a resist as a mask. By this arrangement, the reflective film 3 for reflecting the THz wave incident to the temperature detecting portion 14 of each pixel and the contact 4 for connecting the electrode wiring 9 and the read-out integrated circuit 2a are formed on the circuit substrate 2. It is only necessary that the above metal is a material with high THz-wave reflectivity and small electric resistance and is not limited to Al, Ti.

Next, on the whole face of the circuit substrate 2, a silicon oxide film (SiO, $SiO_2$), a silicon nitride film (SiN, $Si_3N_4$), a silicon oxynitride film (SiON) or the like is formed with the film thickness of approximately 100 to 500 nm by the plasma CVD method, and the first protective film 5 for protecting the reflective film 3 and the contact 4 is formed.

Figure 3:
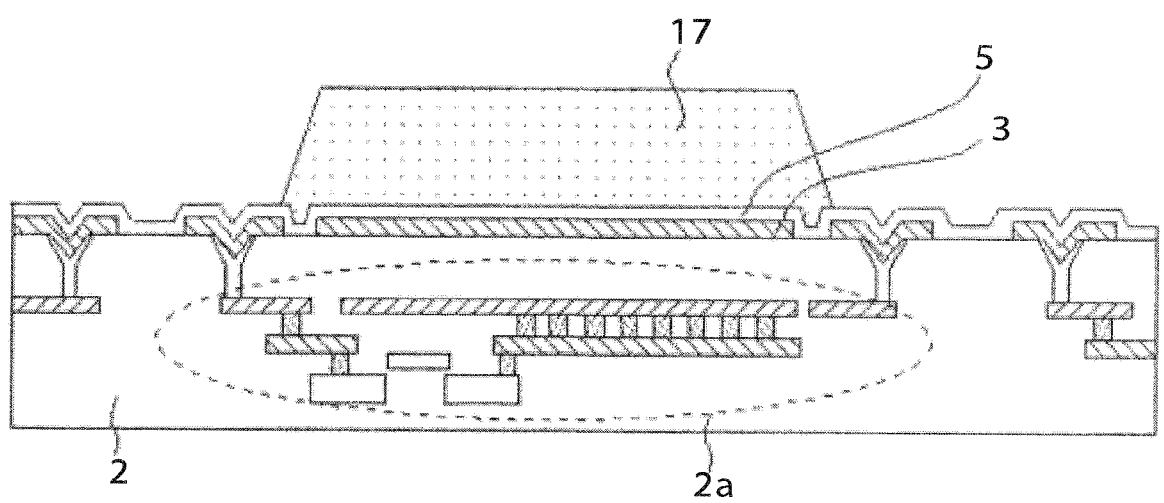
FIG. 3 is a sectional view illustrating a manufacturing method of the bolometer-type THz-wave detector according to the first embodiment of the present invention.

Next, as shown in FIG. 3, an organic film such as a photo-sensitive polyimide film is applied on the whole face of the circuit substrate 2 and that is exposed and developed so that the contact 4 and a region between the pixels are exposed. After that, baking is conducted at a temperature of approximately 400° C., and a sacrifice layer 17 for forming a microbridge structure is formed. At that time, the photo-sensitive polyimide film after being cured is set so that the gap between the reflective film 3 and the temperature detecting portion 14 is approximately ¼ of the wavelength of the infrared ray (1.5 to 2.5 μm, for example).

Figure 4:
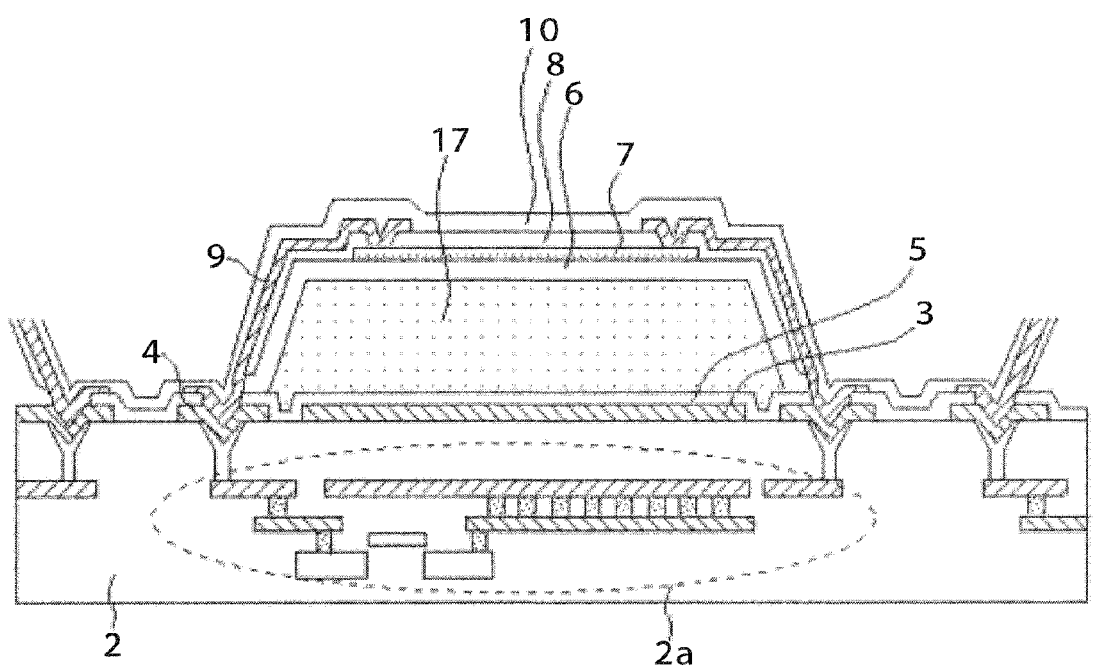
FIG. 4 is a sectional view illustrating a manufacturing method of the bolometer-type THz-wave detector according to the first embodiment of the present invention.

Next, as shown in FIG. 4, on the sacrifice layer 17, the silicon oxide film (SiO, $SiO_2$), the silicon nitride film (SiN, $Si_3N_4$), the silicon oxynitride film (SiON) or the like with the film thickness of approximately 100 to 500 nm is formed by the plasma CVD method, and the second protective film 6 is formed.

Next, on the second protective film 6, vanadium oxide ($V_2O_3$, $VO_X$ and the like) and titanium oxide ($TiO_X$) is deposited with the film thickness of approximately 50 to 200 nm by reactive sputter in an oxygen atmosphere, and a pattern is formed with the resist as the mask. By this arrangement, the bolometer thin film 7 is formed in a region to be the temperature detecting portion 14. Vanadium oxide or titanium oxide is used as the bolometer thin film 7 here, but another material with a large TCR (Temperature Coefficient Resistance) may be used.

Next, the silicon oxide film (SiO, $SiO_2$), the silicon nitride film (SiN, $Si_3N_4$), the silicon oxynitride film (SiON) or the like with the film thickness of approximately 50 to 200 nm is formed by the plasma CVD method so as to form the third protective film 8 protecting the bolometer thin film 7. After that, the first protective film 5, the second protective film 6 and the third protective film 8 on the contact 4 and the third protective film 8 at the end portion of the bolometer thin film 7 are removed.

Next, a film of metal such as Al, Cu, Au, Ti, W, Mo and the like is formed with the film thickness of approximately 50 to 200 nm is formed by the sputtering method and then, a pattern is formed with the resist as the mask, and the electrode wiring 9 is formed. The electrode wiring 9 electrically connects the bolometer thin film 7 and the read-out integrated circuit 2a in the circuit substrate 2 through the contact 4 and also plays a role as the supporting portion 13 holding the bolometer thin film 7 in the air.

After that, the silicon oxide film (SiO, $SiO_2$), the silicon nitride film (SiN, $Si_3N_4$), the silicon oxynitride film (SiON) or the like with the film thickness of approximately 100 to 500 nm is formed by the plasma CVD method so as to form the fourth protective film 10 protecting the electrode wiring 9.

Figure 5:
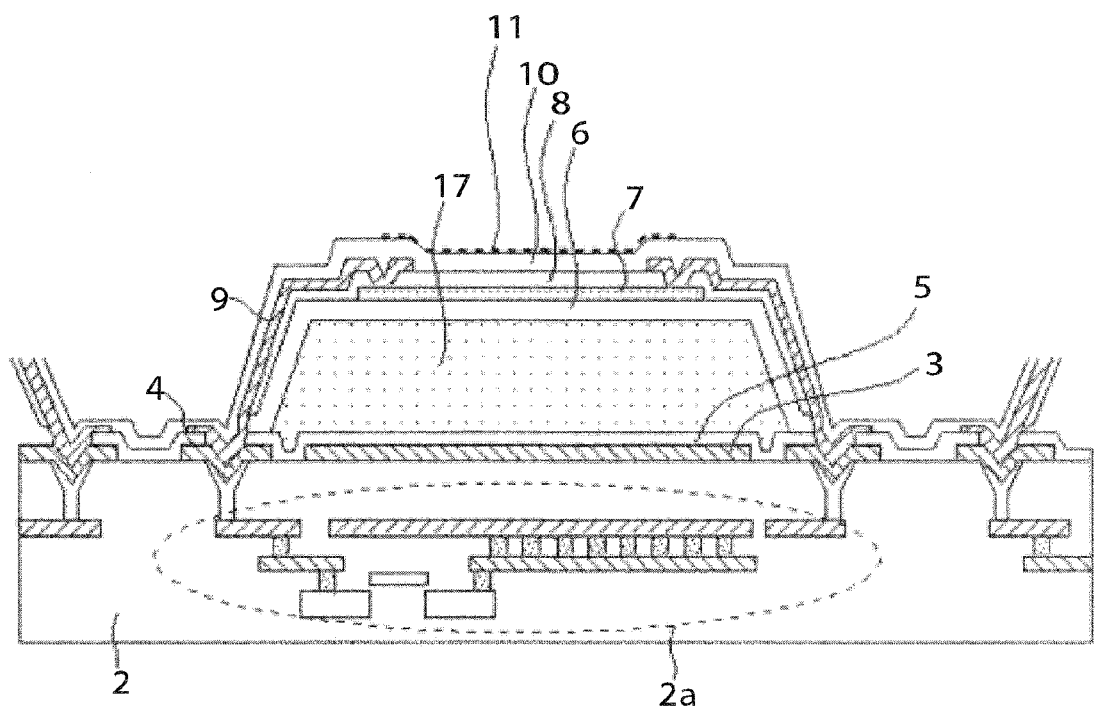
FIG. 5 is a sectional view illustrating a manufacturing method of the bolometer-type THz-wave detector according to the first embodiment of the present invention.

Next, as shown in FIG. 5, a film of metal such as Al, Ti and the like is formed by the sputtering method and then, a pattern is formed with the resist as the mask so as to form the absorbing film 11. At that time, the film thickness is set so that the sheet resistance of the temperature detecting portion 14 with the second protective film 6, the third protective film 8, the bolometer thin film 7, the fourth protective film 10, and the absorbing film 11 together is approximately 10 to 100 Ω/sq. The absorbing film 11 plays a role in efficiently absorbing the THz wave. It is only necessary that the metal is a material which can set the sheet resistance of the temperature detecting portion 14 approximately at 10 to 100 Ω/sq., and it is not limited to Al, Ti.

After that, by the plasma etching using a mixed gas of methane monofluoride and oxygen, etching is applied to a predetermined region of the second protective film 6, the third protective film 8, and the fourth protective film 10. By this arrangement, a through hole is formed in a predetermined region on the sacrifice layer 17 so as to partially expose polyimide. Next, by ashing using $O_2$ gas plasma, the sacrifice layer 17 is removed. By this arrangement, the bolometer-type THz-wave detector 1 with the micro-bridge structure in which the temperature detecting portion 14 is floated by the supporting portion 13 from the circuit substrate 2 is completed.

The sacrifice layer 17 may be constituted by polysilicon or Al. When polysilicon is used, the sacrifice layer 17 can be removed by wet etching using hydrazine or tetramethylammonium hydroxide (TMAH), for example, or dry etching using $XeF_2$ plasma or the like. When Al is used, the sacrifice layer 17 can be removed by the wet etching using hydrochloric acid or hot phosphoric acid, for example.

When the silicon oxide film is used for the second protective film 6, the third protective film 8, and the fourth protective film 10, the sacrifice layer 17 may be constituted by a silicon nitride film, and moreover, vice versa. When the silicon nitride film is used as the sacrifice layer 17, it can be removed by the wet etching using hot phosphoric acid, for example. If the silicon oxide film is used as the sacrifice layer 17, it can be removed by the wet etching using hydrofluoric acid, for example.

In this embodiment, as mentioned above, the structure and manufacturing method of the bolometer-type infrared detector are used, the absorbing film 11 is added to the temperature detecting portion 14, the gap between the reflective film 3 and the temperature detecting portion 14 is set on the basis of the wavelength of the infrared ray, and the sheet resistance of the temperature detecting portion 14 is set to approximately 10 to 100 Ω/sq. so that the THz-wave absorptance can be drastically improved. Therefore, the high-performance bolometer-type THz-wave detector 1 can be manufactured with good yield. Also, since the infrared ray can be absorbed with a considerably high absorptance by this bolometer-type THz-wave detector 1, it can be used as the bolometer-type infrared detector as it is.

EXAMPLE 2

Next, the bolometer-type THz-wave detector according to a second embodiment of the present invention will be described referring to FIGS. 8 to 10.

Figure 8:
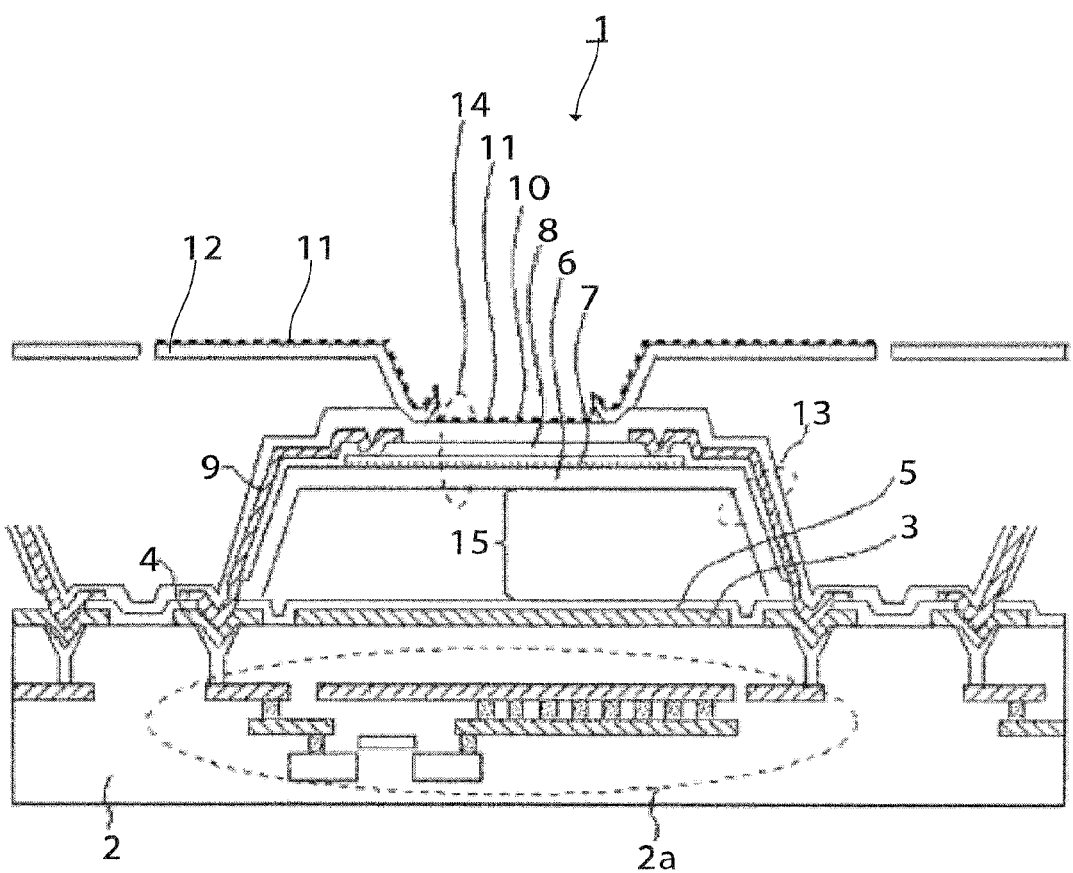
FIG. 8 is a sectional view schematically illustrating a structure of a bolometer-type THz-wave detector according to a second embodiment of the present invention.

As shown in FIG. 8, the bolometer-type THz-wave detector 1 of this embodiment has, on the circuit substrate 2 having the read-out integrated circuit 2a and the like, the reflective film 3 reflecting the incident THz wave and the contact 4 connected to the read-out integrated circuit 2a formed, and the first protective film 5 is formed on top of it. On the contact 4, the supporting portion 13 comprising the second protective film 6, the third protective film 8, the electrode wiring 9, and the fourth protective film 10 is formed. The electrode wiring 9 is connected to the read-out integrated circuit 2a through the contact 4. By the supporting portion 13, the temperature detecting portion 14 (diaphragm) comprising the second protective film 6, the bolometer thin film 7, the third protective film 8, the fourth protective film 10, and the absorbing film 11 is held in the air. The both ends of the bolometer thin film 7 are connected to the electrode wiring 9. On the periphery of the temperature detecting portion 14, a canopy 12 is formed so that the THz wave incident to the periphery of the temperature detecting portion 14 can be absorbed.

In such a structure, too, by setting the gap between the reflective film 3 and the temperature detecting portion 14 to 1.5 to 2.5 μm and the sheet resistance of the temperature detecting portion 14 to a range of approximately 10 to 100 Ω/sq., the high-performance bolometer-type THz-wave detector can be manufactured with high yield using the structure and manufacturing method of the infrared detector.

The manufacturing method of the bolometer-type THz-wave detector 1 with the above structure will be described below referring to FIGS. 9 and 10.

First, similarly to the first embodiment mentioned above, on the circuit substrate 2 having the read-out integrated circuit 2a such as the CMOS circuit, the reflective film 3 and the contact 4 are formed, and after the first protective film 5 is formed on top of that, the sacrifice layer 17 is formed in a region to be the temperature detecting portion 14. Next, the second protective film 6, the bolometer thin film 7, and the third protective film 8 are formed on the sacrifice layer 17. Then, the first protective film 5, the second protective film 6 and the third protective film 8 on the contact 4, and the third protective film 8 at the end portion of the bolometer thin film 7 are removed. Next, the electrode wiring 9 and the fourth protective film 10 are formed.

Next, by plasma etching using a mixed gas of methane monofluoride and oxygen, the second protective film 6, the third protective film 8, and the fourth protective film 10 are partially etched. By this arrangement, a through hole is formed in a predetermined region on the sacrifice layer 17 so as to partially expose polyimide.

Figure 9:
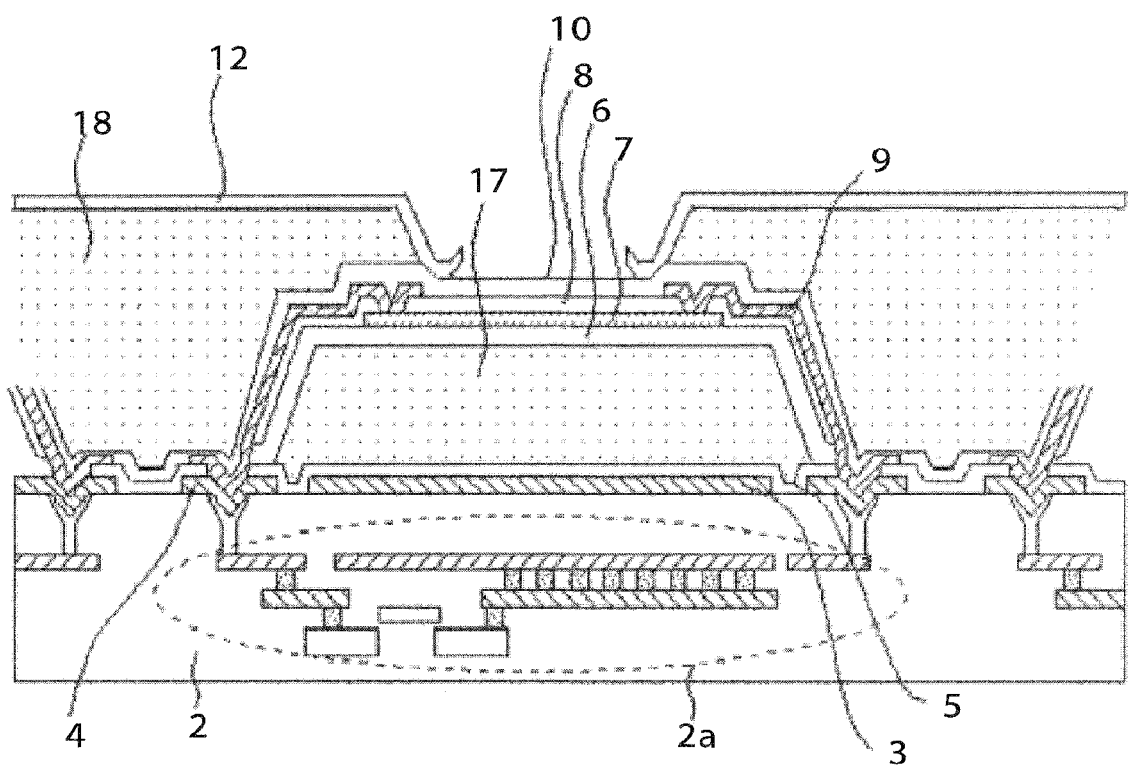
FIG. 9 is a sectional view illustrating a manufacturing method of the bolometer-type THz-wave detector according to the second embodiment of the present invention.

Next, as shown in FIG. 9, photosensitive polyimide is applied on the whole surface of the circuit substrate 2 and that is exposed and developed so that the peripheral part of the temperature detecting portion 14 is exposed. After that, by applying heat treatment, a second sacrifice layer 18 is formed at the center part of the temperature detecting portion 14 and a region between the adjacent temperature detecting portions 14. The thickness of the second sacrifice layer 18 is approximately 0.5 to 3 μm, for example.

Next, an insulating material such as a silicon oxide film (SiO, $SiO_2$), a silicon nitride film (SiN, $Si_3N_4$), a silicon oxynitride film (SiON) or the like is formed with the film thickness of approximately 300 to 600 nm. Subsequently, the insulating material on the center part of the temperature detecting portion 14 is removed so as to form the canopy 12.

Figure 10:
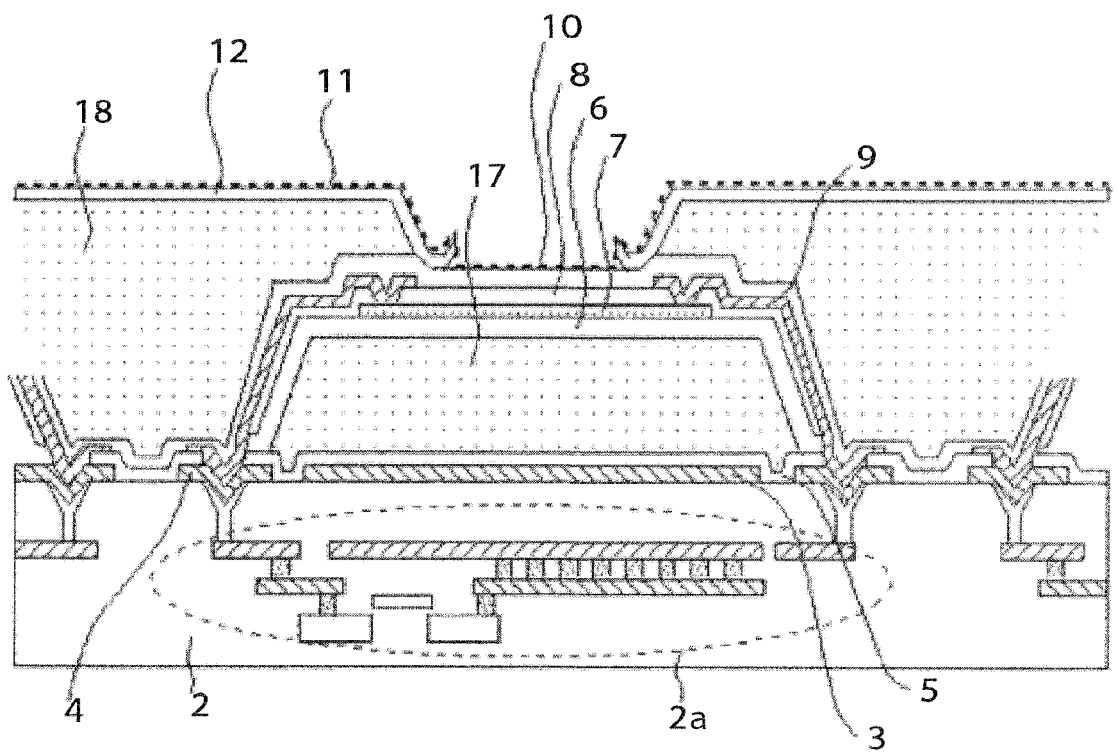
FIG. 10 is a sectional view illustrating a manufacturing method of the bolometer-type THz-wave detector according to the second embodiment of the present invention.
Figure 11:
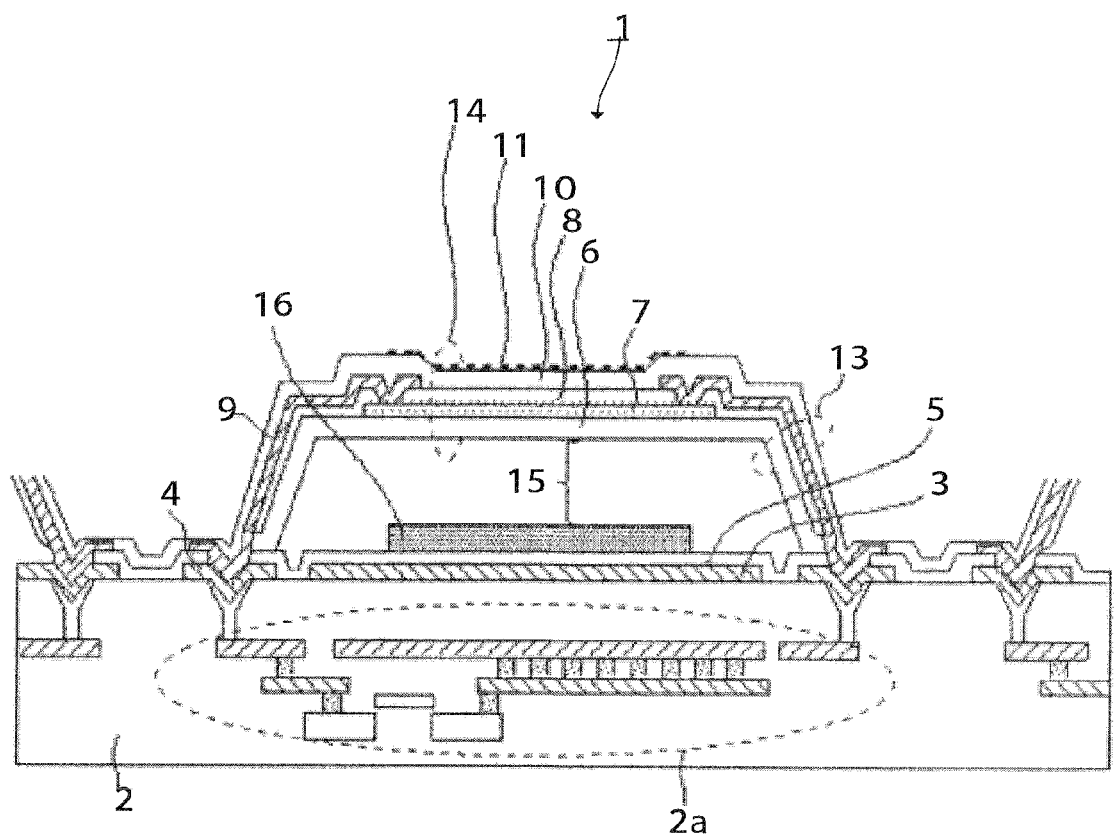
FIG. 11 is a sectional view schematically illustrating a structure of the bolometer-type THz-wave detector according to a third embodiment of the present invention.

Then, as shown in FIG. 10, a film of metal such as Al, Ti is formed by the sputtering method and then, a pattern is formed with the resist as the mask, and the absorbing film 11 is formed on the center part of the temperature detecting portion 14 and on the canopy 12. At that time, similarly to the first embodiment, the film thickness is set so that the sheet resistance of the temperature detecting portion 14 with the second protective film 6, the third protective film 8, the bolometer thin film 7, the fourth protective film 10, the absorbing film 11, and the canopy 12 together becomes approximately 10 to 100 Ω/sq.

After that, a through hole is formed at the canopy 12 between adjacent pixels and polyimide is partially exposed. Next, by ashing using $O_2$ gas plasma, the sacrifice layer 17 and the second sacrifice layer 18 are removed. By this arrangement, the bolometer-type THz-wave detector 1 with the micro-bridge structure in which the temperature detecting portion 14 is floated by the supporting portion 13 from the circuit substrate 2 is completed.

In this embodiment, too, the sacrifice layer 17 may be constituted by polysilicon or Al, and if a silicon oxide film is used for the second protective film 6, the third protective film 8, and the fourth protective film 10, the sacrifice layer 17 can be constituted by a silicon nitride film and vice versa.

In this embodiment, too, as mentioned above, the structure and manufacturing method of the bolometer-type infrared detector are used, the absorbing film 11 is added to the temperature detecting portion 14 and the canopy 12, the gap between the reflective film 3 and the temperature detecting portion 14 is set on the basis of the wavelength of the infrared ray, and the sheet resistance of the temperature detecting portion 14 is set to approximately 10 to 100 Ω/sq. so that the high-performance bolometer-type THz-wave detector 1 can be manufactured with good yield. Also, the bolometer-type THz-wave detector 1 of this embodiment can absorb not only the THz wave incident to the temperature detecting portion 14 but also the THz wave incident to the periphery of the temperature detecting portion 14 by the canopy 12. Since the bolometer-type THz-wave detector 1 can also absorb the infrared ray with a considerably high absorptance, it can be used as the bolometer-type infrared detector as it is.

EXAMPLE 3

Next, the bolometer-type THz-wave detector according to a third embodiment of the present invention will be described referring to FIGS. 11 to 15B.

In the bolometer-type THz-wave detector of the present invention, in order to form the optical resonance structure suitable for the THz wave, the gap between the reflective film 3 and the temperature detecting portion 14 is preferably wider. On the other hand, if the gap between the reflective film 3 and the temperature detecting portion 14 is made wider, the formation or removal of the sacrifice layer 17 becomes difficult. Then, in this embodiment, by interposing a member with a predetermined refractive index (referred to as an optical film 16) between the reflective film 3 and the temperature detecting portion 14, the optical path length with the refractive index considered is changed.

It is only necessary that the optical film 16 is a member with a large refractive index, a small absorption of the THz wave and favorable process suitability. For example, a silicon oxide film (SiO, $SiO_2$), a silicon nitride film (SiN, $Si_3N_4$), a silicon oxynitride film (SiON), a silicon film or the like may be used. Since the optical path length between the reflective film 3 and the temperature detecting portion 14 is changed by interposing the optical film 16, the sheet resistance of the temperature detecting portion 14 is set on the basis of the FIGS. 14A, 14B, 15A, and 15B and FIGS. 6A, 6B, 7A, and 7B in the first embodiment.

Figure 14A:
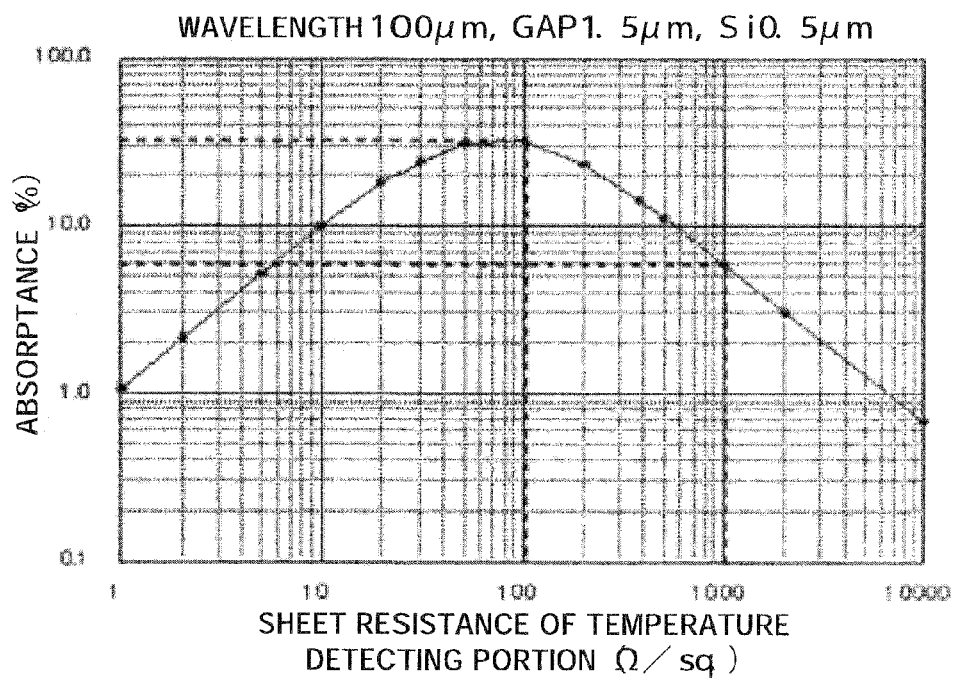
FIG. 14A is a diagram illustrating correlation between sheet resistance of a temperature detecting portion and an absorptance of a THz wave with a wavelength of 100 μm of the bolometer-type THz-wave detector according to the third embodiment of the present invention (when a gap between a reflective film and the temperature detecting portion is 1.5 μm)
Figure 14B:
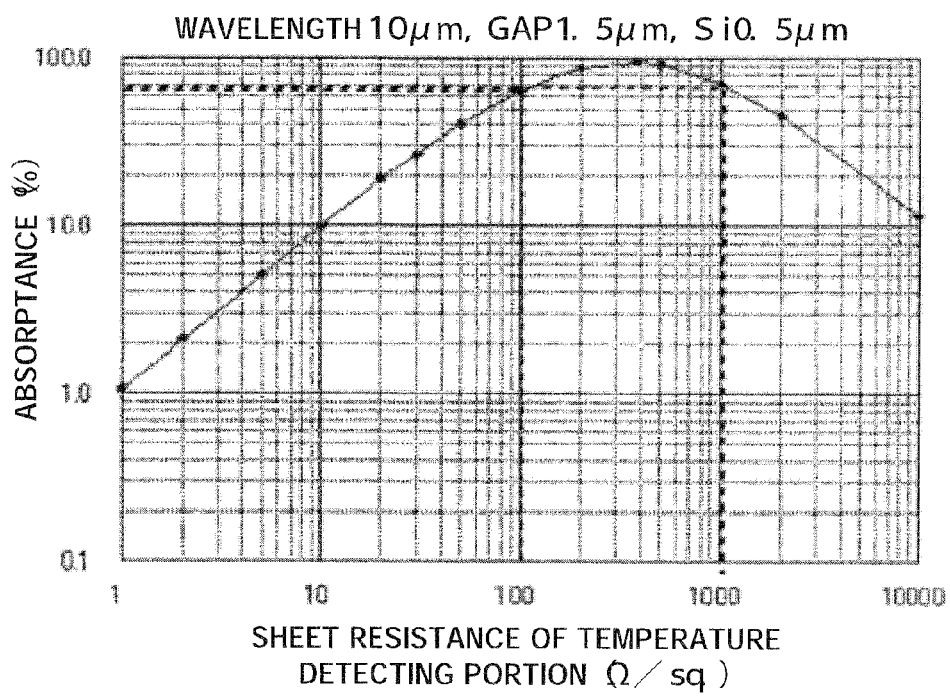
FIG. 14B is a diagram illustrating correlation between sheet resistance of a temperature detecting portion and an absorptance of an infrared ray with a wavelength of 10 μm of the bolometer-type THz-wave detector according to the third embodiment of the present invention (when a gap between a reflective film and the temperature detecting portion is 1.5 μm)

FIGS. 14A and 14B are diagrams illustrating correlation between the sheet resistance of the temperature detecting portion 14 and the absorptance of the electromagnetic wave when a silicon film with the refractive index of 3.4 and the film thickness of 0.5 μm is provided on the reflective film 3, and the gap (GAP) between the reflective film 3 and the temperature detecting portion 14 is set to 1.5 μm, in which FIG. 14A shows the absorption characteristic of the THz wave with the wavelength of 100 μm and FIG. 14B shows the absorption characteristic of the infrared with the wavelength of 10 μm. When FIGS. 14A, 14B are compared with FIGS. 6A, 6B, there is no particular difference in the absorption characteristic of the infrared, but the absorption characteristic of the THz wave has its peak position shifted to the right direction in the figure (direction with larger sheet resistance). Also, the absorptance of the THz wave is increased as a whole. That is considered to be because the optical path length becomes 3.2 μm by interposition of the silicon film with the refractive index of 3.4 and the film thickness of 0.5 μm, which is close to the optical resonance condition of the THz wave.

Figure 15A:
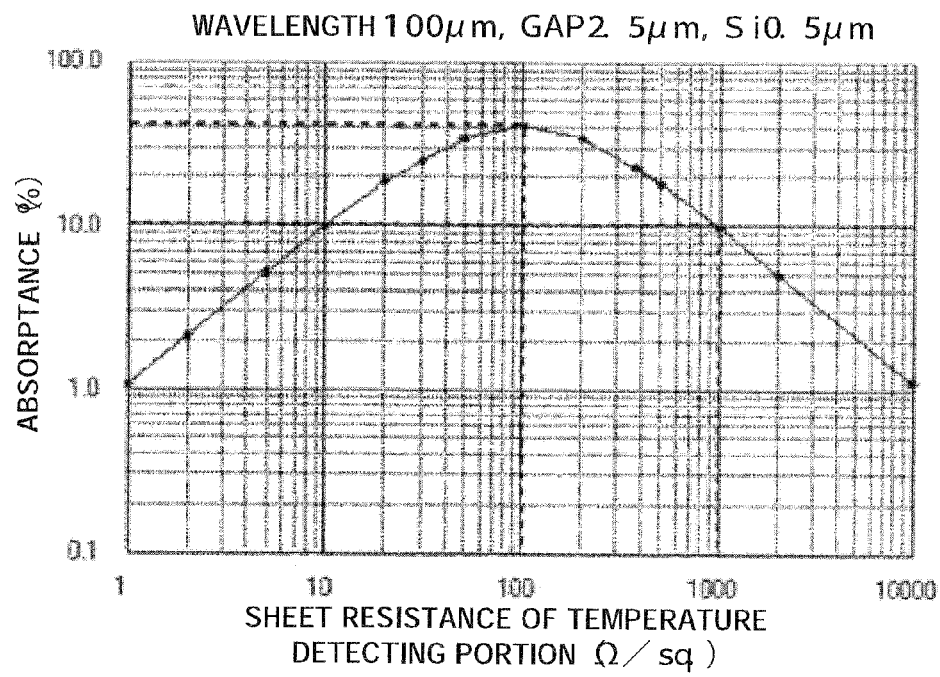
FIG. 15A is a diagram illustrating correlation between sheet resistance of a temperature detecting portion and an absorptance of a THz wave with a wavelength of 100 μm of the bolometer-type THz-wave detector according to the third embodiment of the present invention (when a gap between a reflective film and the temperature detecting portion is 2.5 μm)
Figure 15B:
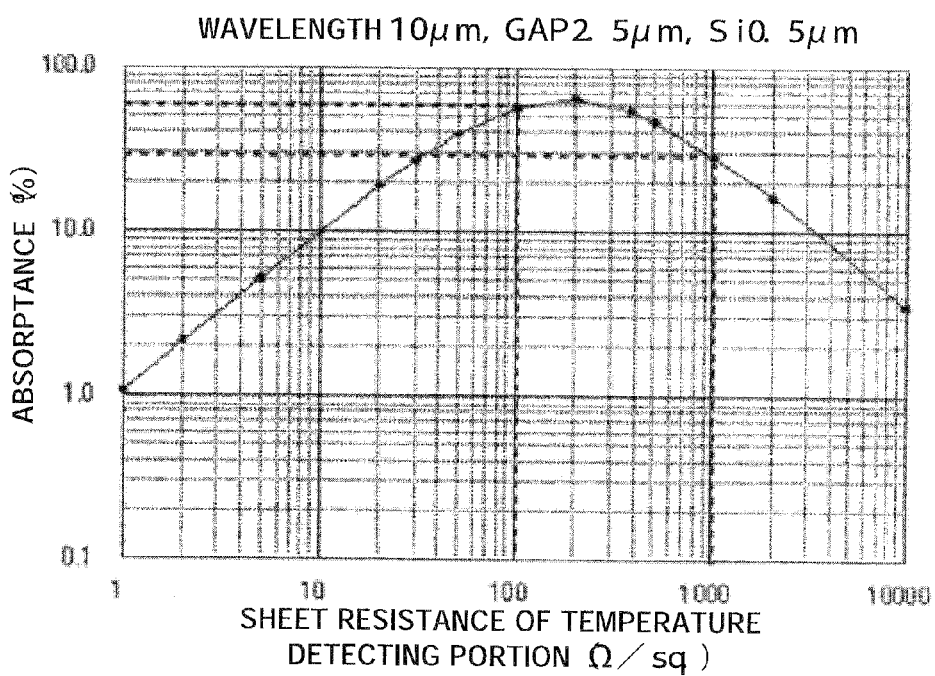
FIG. 15B is a diagram illustrating correlation between sheet resistance of a temperature detecting portion and an absorptance of an infrared ray with a wavelength of 10 nm of the bolometer-type THz-wave detector according to the third embodiment of the present invention (when a gap between a reflective film and the temperature detecting portion is 2.5 μm)
Figure 16A:
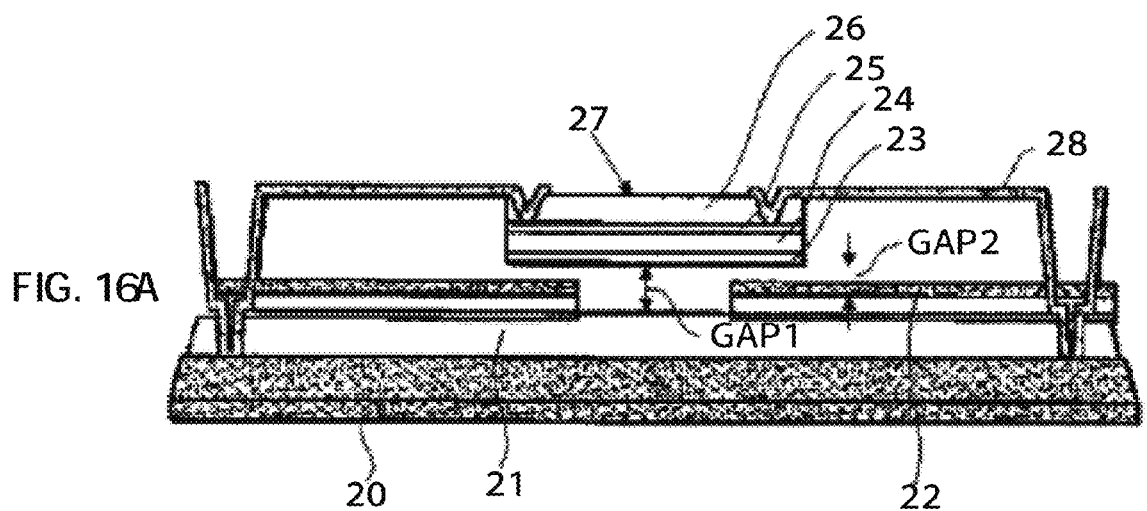
FIG. 16A is a sectional view illustrating a structure of a conventional THz-wave detector.
Figure 16B:
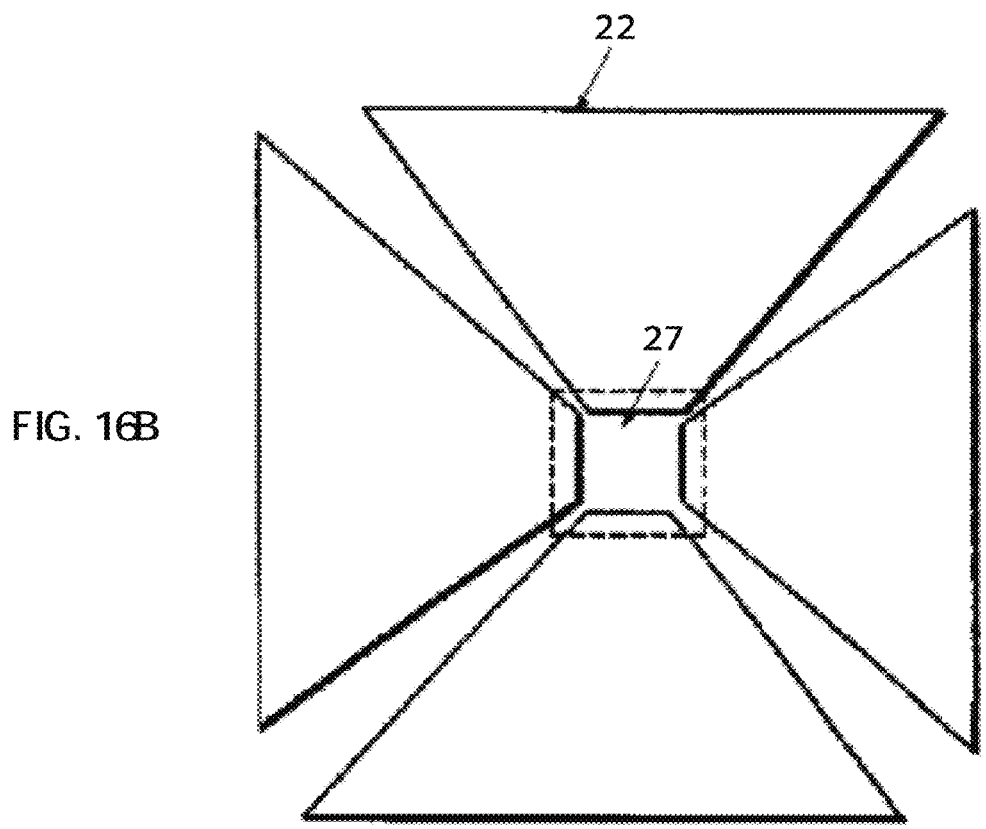
FIG. 16B is a top view illustrating a structure of a conventional THz-wave detector.
Figure 17A:
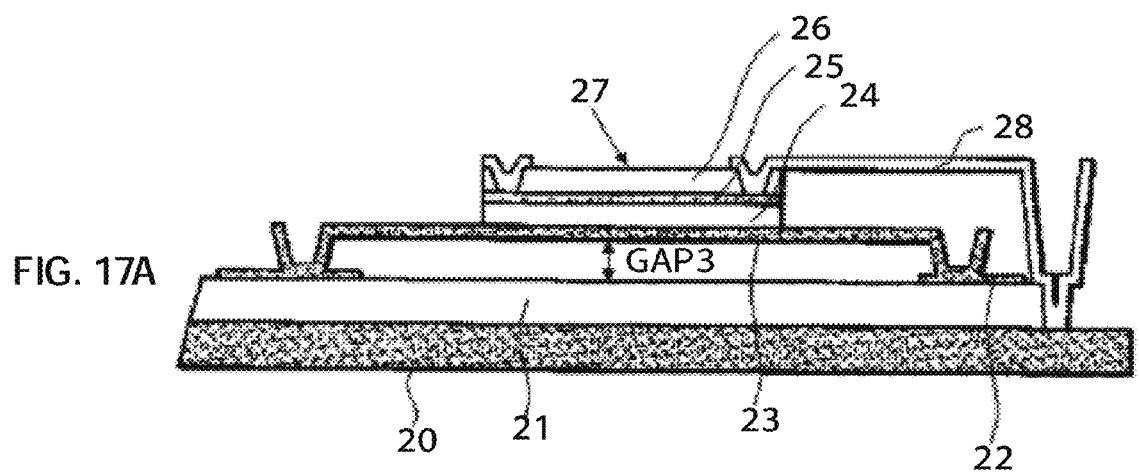
FIG. 17A is a sectional view illustrating a structure of a conventional THz-wave detector.
Figure 17B:
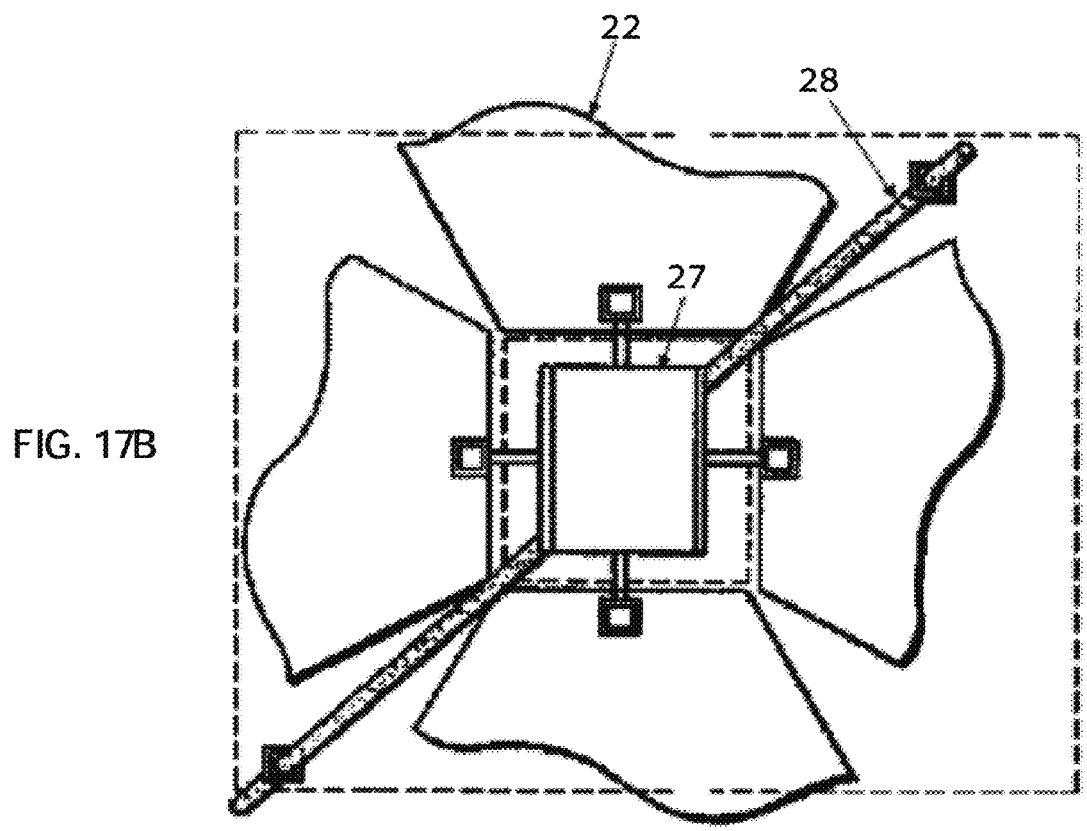
FIG. 17B is a top view illustrating a structure of a conventional THz-wave detector.

FIGS. 15A and 15B are diagrams illustrating the correlation between the sheet resistance of the temperature detecting portion 14 and the absorptance of the electromagnetic wave when a silicon film with the refractive index of 3.4 and the film thickness of 0.5 μm is provided on the reflective film 3, and the gap (GAP) between the reflective film 3 and the temperature detecting portion 14 is set to 2.5 μm, in which FIG. 15A shows the absorption characteristic of the THz wave with the wavelength of 100 μm and FIG. 15B shows the absorption characteristic of the infrared with the wavelength of 10 μm. When FIGS. 15A, 15B are compared with FIGS. 7A, 7B, the absorption characteristic of the infrared ray has its peak position shifted to the left direction in the figure (direction with smaller sheet resistance), and the absorptance of the infrared ray is lowered as a whole. On the other hand, the absorption characteristic of the THz wave has its peak position shifted to the right direction in the figure (direction with larger sheet resistance), and the absorptance of the THz wave is increased as a whole. That is considered to be because the optical path length becomes 4.2 μm by interposition of the silicon film with the refractive index of 3.4 and the film thickness of 0.5 μm, which is far from the optical resonance condition for the infrared ray and close to the optical resonance condition for the THz wave.

From the above results, by interposing the optical film 16 with the predetermined refractive index on the reflective film 3, even though the gap between the reflective film 3 and the temperature detecting portion 14 is not changed, the absorptance of the THz wave can be drastically increased. In this case, the preferable range of the sheet resistance of the temperature detecting portion 14 depends on the refractive index and film thickness of the optical film 16. However, similarly to the first embodiment, even though being somewhat offset from the peak position, the THz wave can be sufficiently detected if the absorptance is 10% or more. Thus, it is only necessary that the sheet resistance of the temperature detecting portion 14 is in a range of 10 to 100 Ω/sq. from FIGS. 14A and 15A. In this embodiment, too, by inserting a bandpass filter shielding the infrared ray on the incident face side of the bolometer-type THz-wave detector 1, only the THz wave can be efficiently detected.

The manufacturing method of the bolometer-type THz-wave detector with the above structure will be described referring to FIGS. 12 and 13.

First, similarly to the first and second embodiments, on the circuit substrate 2 having the read-out integrated circuit 2a such as the CMOS circuit, the reflective film 3 and the contact 4 are formed, and on top of that, the first protective film 5 is formed.

Figure 12:
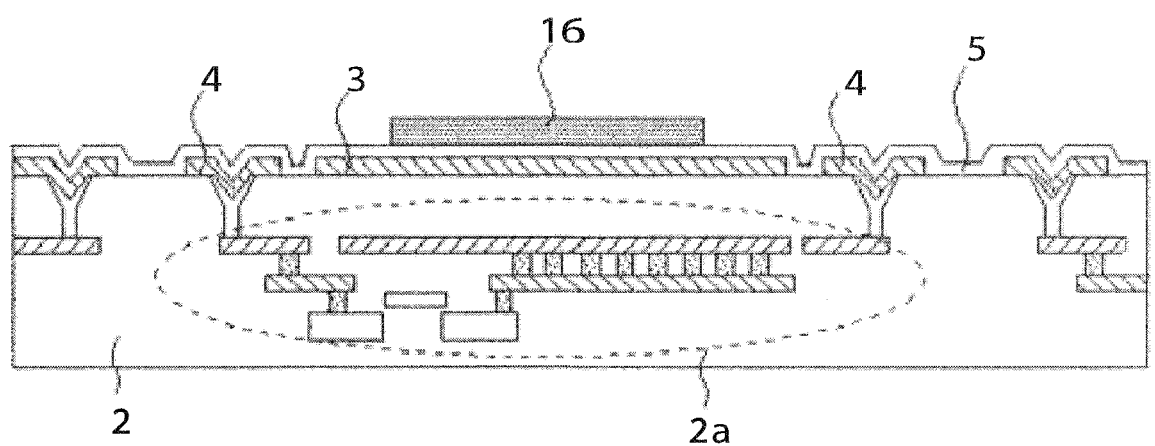
FIG. 12 is a sectional view illustrating a manufacturing method of the bolometer-type THz-wave detector according to the third embodiment of the present invention.

Next, in this embodiment, as shown in FIG. 12, a film of a silicon oxide film (SiO, $SiO_2$), a silicon nitride film (SiN, $Si_3N_4$), a silicon oxynitride film (SiON), a silicon film or the like with a predetermined film thickness is formed by the plasma CVD method or the like, a pattern is formed with the resist as the mask, and the optical film 16 is formed on the reflective film 3. The optical film 16 does not necessarily have to be formed on the whole surface of the reflective film 3 but it is only necessary to form the film at least on a portion opposed to the temperature detecting portion 14. If the film thickness of the optical film 16 is made larger, the optical path length is increased and the absorption of the THz wave can be increased.

Figure 13:
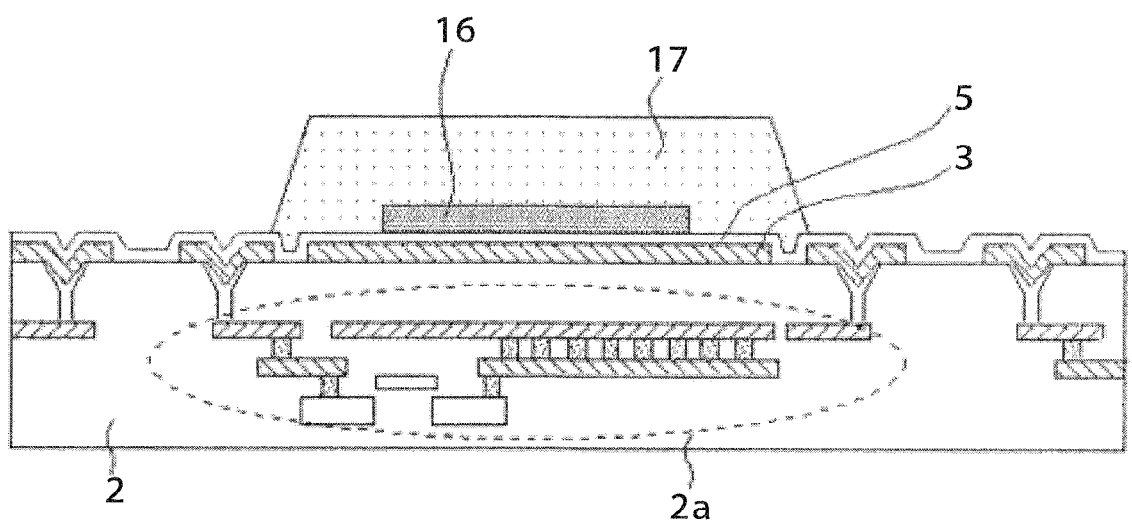
FIG. 13 is a sectional view illustrating a manufacturing method of the bolometer-type THz-wave detector according to the third embodiment of the present invention.

Next, as shown in FIG. 13, an organic film such as photosensitive polyimide film is applied on the whole surface of the circuit substrate 2, baked at a temperature of approximately 400° C. and the sacrifice layer 17 for forming the micro-bridge structure is formed. At that time, the photosensitive polyimide film after being cured is set so that the gap between the reflective film 3 and the temperature detecting portion 14 is approximately ¼ of the wavelength of the infrared ray (1.5 to 2.5 μm, for example).

After that, similarly to the first and second embodiments, the second protective film 6, the bolometer thin film 7, and the third protective film 8 are formed on the sacrifice layer 17. Then, the first protective film 5, the second protective film 6 and the third protective film 8 on the contact 4 and the third protective film 8 at the end portion of the bolometer thin film 7 are removed. Next, the electrode wiring 9 and the fourth protective film 10 are formed.

Next, by the sputtering method, a film of metal such as Al, Ti is formed, a pattern is formed with the resist as the mask, and the absorbing film 11 is formed on the temperature detecting portion 14. At that time, the film thickness is set so that the sheet resistance of the temperature detecting portion 14 with the second protective film 6, the third protective film 8, the bolometer thin film 7, the fourth protective film 10, and the absorbing film 11 together becomes approximately 10 to 100 Ω/sq. similarly to the first and second embodiments. If the canopy 12 is formed on the temperature detecting portion 14 as in the second embodiment, the second sacrifice layer 18 is formed at the center portion of the temperature detecting portion 14 and a region between the adjacent temperature detecting portions 14. Next, the insulating member is formed on the second sacrifice layer 18, and the insulating member at the center part of the temperature detecting portion 14 is removed so as to form the canopy 12. Then, the absorbing film 11 is formed on the temperature detecting portion 14 and the canopy 12.

After that, by ashing using $O_2$ gas plasma, the sacrifice layer 17 (or the sacrifice layer 17 and the second sacrifice layer 18) is removed. By this arrangement, the bolometer-type THz-wave detector 1 with the micro-bridge structure in which the temperature detecting portion 14 is floated by the supporting portion 13 from the circuit substrate 2 is completed.

In this embodiment, too, the sacrifice layer 17 may be constituted by polysilicon or Al, and if the silicon oxide film is used for the second protective film 6, the third protective film 8, and the fourth protective film 10, the sacrifice layer 17 can be constituted by the silicon nitride film and vice versa.

In this embodiment, too, as mentioned above, using the structure and manufacturing method of the bolometer-type infrared detector, the absorbing film 11 is added to the temperature detecting portion 14, the optical film 16 is formed on the reflective film 3 so as to increase the optical path length between the reflective film 3 and the temperature detecting portion 14, and the sheet resistance of the temperature detecting portion 14 is set approximately to 10 to 100 Ω/sq. so that the absorptance of the THz wave can be further improved. Thus, the high-performance bolometer-type THz-wave detector 1 can be manufactured with good yield. Also, since the bolometer-type THz-wave detector 1 can also absorb the infrared ray with a considerably high absorptance, it can be used as the bolometer-type infrared detector as it is.

In each of the above embodiments, the bolometer-type THz-wave detector 1 provided with the bolometer thin film as the temperature detecting portion has been described, but the present invention is not limited to the above embodiments. For example, it may be similarly applied to those provided with a thermopile as the temperature detecting portion. Also, a case where the THz wave with the wavelength of approximately 30 μm to 1 mm is detected has been described in each of the above embodiments, but it may be also applied to an electromagnetic wave with a longer wavelength.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The present application is based on Japanese Patent Application No. 2007-081827 filed with Japan Patent Office on Mar. 27, 2007, whose contents are incorporated herein by reference.

What is claimed is:

1. A bolometer-type THz-wave detector comprising:
   a substrate provided with a read-out integrated circuit;
   a temperature detecting portion opposed to said substrate and provided with a bolometer film and an absorbing film for absorbing a THz wave and having a sheet resistance in a range of 30 to 50 Ω/square;
   a reflective film formed on a face opposed to the temperature detecting portion of said substrate for reflecting said THz wave and forming an optical resonance structure with said temperature detecting portion;
   a supporting portion arranged on said substrate and supporting said temperature detecting portion so that a gap between said reflective film and said temperature detecting portion is in a range of 1.5 to 2.5 μm; and
   electrode wiring connecting said read-out integrated circuit and said bolometer film.

2. The bolometer-type THz-wave detector according to claim 1, further comprising an optical film having a predetermined refractive index transmitting said THz wave between said reflective film and said temperature detecting portion.

3. The bolometer-type THz-wave detector according to claim 2, wherein said optical film comprises any one of a silicon oxide film, a silicon nitride film, a silicon oxynitride film and a silicon film.

4. The bolometer-type THz-wave detector according to claim 1, further comprising a canopy extending outward from a peripheral portion of said temperature detecting portion, and wherein said absorbing film is formed on the canopy.

* * * * *